UNITED STATES PATENT OFFICE.

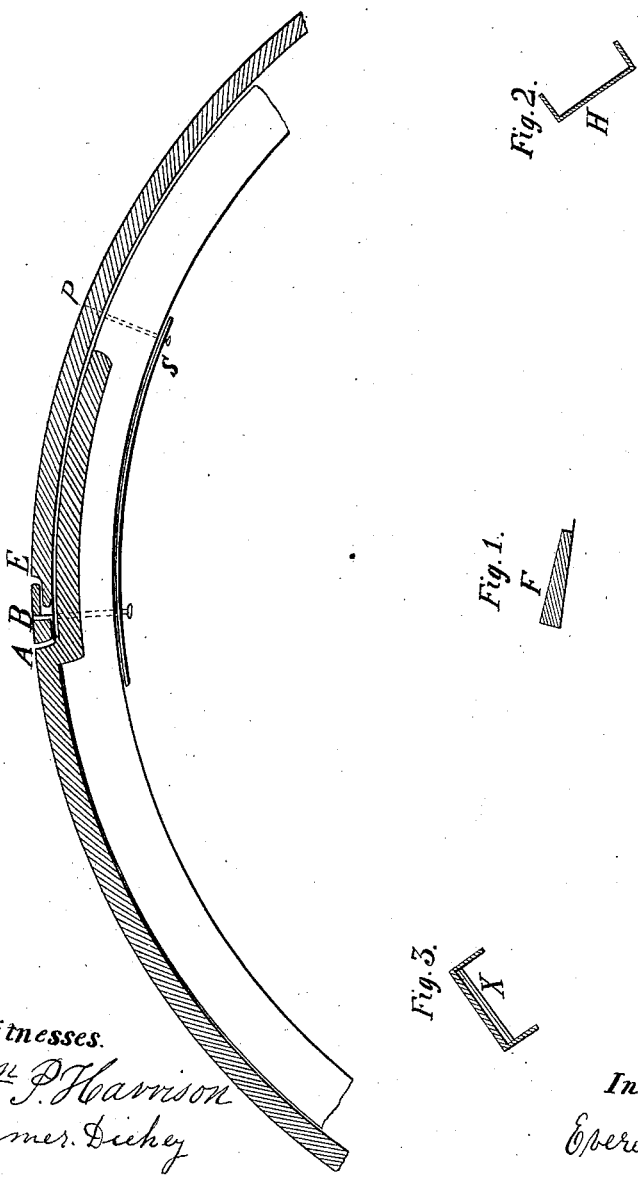

EVERETT BASS, OF CALHOUN COUNTY, GEORGIA.

TIGHTENING TIRES ON WHEELS.

Specification of Letters Patent No. 29,947, dated September 11, 1860.

*To all whom it may concern:*

Be it known that I, EVERETT BASS, in the county of Calhoun, in the State of Georgia, have invented a new and Improved Mode of Tightening Tires on Wheels; and I do hereby declare that the following is a full and exact description thereof, reference being had to the accompanying drawings and to the letters of reference marked thereon.

The nature of my invention consists in lapping the ends of the tire in such a manner as that they may be tightened by inserting a clasp and key perpendicularly through the lap in the tire; constructing the hole through which the clasp and key is inserted so that forcing the key through will draw the tire, regaining the drawing effect of the key by adding a slip or slips (as may be necessary) to the clasp.

To enable others skilled in the art to make and use my invention I will proceed to describe its construction and operation.

I construct my tire so that the ends of the tire will lap together. I offset the inner ply of the lap, as shown at A in the accompanying drawing, and on the offset portion I lap the outer ply E, making the outside surface of the tire uniform. I insert bolt B, (having a square head the size of width of tire) through the offset or inner ply, fitting one edge of the bolt head to the shoulder of the offset. Under the opposite edge of the bolt head from the offset I form an opening in which I place the end of the top ply of the lap E in a manner to slip farther under when the tire is tightened. I form an oblong hole through both plies of the lap before the laps are put together, so that when the laps are properly lapped together the longitudinal holes in the plies of the lap come partly together and form one entire hole through the lap smaller than the holes in the plies of the lap when the plies are separate. I insert clasp H, as shown at section Fig. 2, in the accompanying drawing, through the entire hole, clasping the lap in the tire and the plate S on the inside of the felly and the felly all together. I then force key F, as shown at section Fig. 1, in the same entire hole back of the clasp H, which will draw the tire, and when the tire is to be redrawn I take out the key F and add slips to the clasp H, as shown at section Fig. 3, at X in the accompanying drawing, which will regain the drawing effect of the key when it is forced to its place. I secure the key F to its place by screwing a tap on the inner end. I insert bolt P through tire felly and plate S at the opposite end of plate S from bolt B.

What I claim as my invention, and desire to secure by Letters-Patent, is—

The arrangement of the clasp H, slips X, key F, plate bolt head B, and inner plate S, when used for the purposes described.

EVERETT BASS.

Witnesses:
WM. P. HARRISON,
JAMES DICKEY.